United States Patent [19]

Anderson

[11] 4,064,105
[45] * Dec. 20, 1977

[54] PLASTIC COMPOSITIONS

[75] Inventor: Arnold L. Anderson, Antioch, Ill.

[73] Assignee: Velsicol Chemical Corporation, Chicago, Ill.

[*] Notice: The portion of the term of this patent subsequent to Apr. 5, 1994, has been disclaimed.

[21] Appl. No.: 686,791

[22] Filed: May 17, 1976

Related U.S. Application Data

[63] Continuation-in-part of Ser. No. 330,840, Feb. 8, 1973.

[51] Int. Cl.² .................................................. C08G 5/06
[52] U.S. Cl. ........................ 260/45.75 B; 260/45.95 G
[58] Field of Search .................. 260/45.75 B, 45.95 G

[56] References Cited

U.S. PATENT DOCUMENTS

| 3,658,634 | 4/1972 | Yanagi et al. | 260/45.95 |
| 3,717,609 | 2/1973 | Kutner | 260/45.95 |

Primary Examiner—V. P. Hoke
Attorney, Agent, or Firm—Robert M. Phipps; James J. Mullen

[57] ABSTRACT

Plastic compositions containing a three component system consisting of (1) nylon, (2) a certain bis-phenoxy compound having the formula:

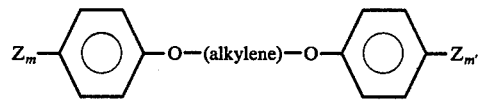

wherein Z is bromine, $m$ and $m'$ are each integers having a value of 5, and alkylene is $-(CH_2)_2-$, and (3) an enhancing agent, hereinafter defined.

15 Claims, No Drawings

PLASTIC COMPOSITIONS

RELATED PATENT APPLICATIONS

This application is a continuation-in-part of a copending application Ser. No. 330,840, filed Feb. 8, 1973. The entire specification of Ser. No. 330,840, is to be considered as incorporated herein by reference.

PRIOR ART

The prior art considered in conjunction with the preparation of this application is as follows: U.S. Pat. No. 1,979,145; U.S. Pat. No. 2,130,990; U.S. Pat. No. 2,186,367; U.S. Pat. No. 2,263,444; U.S. Pat. No. 2,329,033; U.S. Pat. No. 2,488,499; U.S. Pat. No. 2,738,351; U.S. Pat. No. 2,797,246; U.S. Pat. No. 2,930,815; U.S. Pat. No. 3,385,819; U.S. Pat. No. 3,549,591; U.S. Pat. No. 3,560,441; U.S. Pat. No. 3,649,591; U.S. Pat. No. 3,658,634; U.S. Pat. No. 3,666,692; U.S. Pat. No. 3,686,320; U.S. Pat. No. 3,697,456; U.S. Pat. No. 3,717,609; U.S. Pat. No. 3,763,243; U.S. Pat. No. 3,787,506; German Pat. No. 891,549; German Pat. No. 1,139,636; German Pat. No. 2,054,522; Japanese Pat. No. (72) 14,500 (and as cited in Volume 77, Chemical Abstracts column 153737k, 1972); Chemical Abstracts, Volume 13, column 448$^5$; Chemical Abstracts, Volume 31, column 7045$^9$; Chemical Abstracts, Volume 52 (1958), colume 4543–4544; Journal of the Chemical Society, pages 2972–2976 (1963); Journal of the American Chemical Society, Volume 57 (1935), pages 572–574 and Volume 76 (1954), page 2993; Journal of the Science of Food and Agriculture, Volume 20 (1969), pages 748–754; Phillippine Journal of Science, Volume 34 (1927), page 159; and Japanese Patent publication 022, 456 of 1974.

All of these publications are to be considered as incorporated herein by reference.

BACKGROUND OF THE INVENTION

The present invention relates to plastic compositions containing a nylon polymer. More specifically, the present invention covers plastic compositions containing a three component system which consists of nylon, a certain bis-phenoxy compound (hereinafter defined) as a flame retardant for said plastic compositions, and an enhancing agent (hereinafter defined) for said flame retardants.

Nylon and utility thereof are known in the art as exemplified by *Polyamide Resins*, D. E. Floyd, (Reinhold Plastics Applications Series), Reinhold Publishing Corporation, New York, 1958 and *Modern Plastics Encyclopedia* 1972–1973, Vol. 49: No. 10A, October, 1972, pages 54, 56–58, 61, 151, 152, and 205–213 and which publications are in toto incorporated herein by reference.

The need for flame retarding nylon plastics has also been recognized in the art as exemplified by U.S. Pat. No. 3,422,048 and Modern Plastics Encyclopedia, ibid, pages 205–213 and 456–458 and which publications are in toto incorporated herein by reference.

The prior art has specifically recognized the problems of finding suitable flame retardants for nylon in view of the fact that polymer systems differ substantially in both flammability characteristics and physical properties and there is no predictability whatsoever from one system to another. Thus in the Norris et al paper entitled "Toxicological and Environmental Factors Involved in the Selection of Decabromodiphenyl Oxide as a Fire Retardant Chemical", Applied Polymer Symposium No. 22, 195–219 (1973), the authors state: "A growing recognition of the huge annual toll taken by fire is resulting in more stringent flammability requirements for synthetic polymers in a variety of applications". Because of economic constraints and the need to produce flame resistant polymers without total replacement of existing manufacturing processes, increased flame resistance is generally achieved by incorporation of a fire retardant chemical in the finished product. This chemical is usually based on bromine, chlorine, phosphorus, or nitrogen and may either be chemically reacted or physically blended into the product. Since polymer systems differ markedly in both flammability characteristics and physical properties, selection of a suitable flame retardant depends on a variety of factors that severely limits the number of acceptable materials.

"A general class of synthetic polymers that require flame retardancy because of their use in electrical and high temperature applications, but pose severe problems in selecting a suitable flame retardant are the high performance thermoplastic resins such as thermoplastic polyesters, polyphenylene oxides, and acrylonitrile-butadiene-styrene (ABS) terpolymers." Some of the most important criteria for an acceptable flame retardant in these applications are:

1. It must be as effective as possible to minimize both cost and effect on polymer properties. Use levels may range up to 15% by weight.

2. It must have sufficient stability to withstand conditions encountered during polymer processing and use. Processing conditions (blending, extrusion, and molding) often involve temperatures exceeding 300° C. The flame retardant must tolerate these conditions without degradation or volatilazation. Also, attention must be given to hydrolytic stability and oxidative degradation, particularly under extended service at high temperatures.

3. It must be compatible with the base polymer and exert minimal adverse effect on those properties that give the polymer its value. Some of these critical properties are tensile strength, impact strength, heat deflection temperature, shear strength, and flexural modulus.

4. Finally, the flame retardant must not interfere with attainment of desired product esthetics and form.

"Because of the stringent thermal stability requirements, only a very few compounds have been identified which can meet the necessary performance and economic criteria."

The resultant disadvantages in the utilization of various prior art materials as flame retardants, in general, for plastic compositions include, without limitation, factors such as thermal migration, heat instability, light instability, non-biodegradable, toxicity, discoloration, the large amounts employed in order to be effective, and the unpredictable end results obtained when using the same material in different plastics (note, for example, in Modern Plastics Encyclopedia, ibid, page 650, wherein octabromobiphenyl is suitable for use in polyolefins as a flame retardant therefor, but is not shown for use (or functionally equivalent) as such for the other 27 compositions listed such as ABS; polycarbonates, polystyrene, acrylics and polyurethanes). Thus, it can be seen that the field of flame retardancy is highly sophisticated and consequently requires substantial research effort to achieve a particular desired end result.

In conjunction with the rendition of nylon plastics flame retardant the aforegoing discussion is particularly applicable. Furthermore, it is important that, in addition to the retention of good physical characteristics, three characteristics (one of which is critical) of the product (nylon) be within certain limitations in order to provide a functional flame retarded product. These three characteristics are (1) light stability (as measured, for example, by ΔE color values, hereinafter defined), (2) flame retardancy (as measured, for example, by UL-94, hereinafter defined, and which is a critical characteristic and limitation), (3) thermal stability (as measured, for example, by certain ASTM tests for decomposition and migration, hereinafter defined). This characteristic of flame retardancy is not an arbitrary item but is a criteria which is strictly adhered to in the nylon plastic art and hereinafter explained in more detail, with particular reference to the examples contained herein.

In conjunction with the foregoing discussion, the prior art in general suggests the use of halogen-containing materials as "potential" or "possible" to flame retardants for plastic materials. However, the prior art also recognizes that any material must be adjudged on a case by case basis because of the unpredictable results of the end product when any additive is incorporated therein. For example, with reference to the use of a halogenated fire retardant in U.S. Pat. No. 3,658,634, attention is directed to the fact that the patentee specifically points out the disadvantages in the use of a halogen-containing fire retardant. In Column 1, lines 14–17, the patentee states: "Therefore, if it is possible to impart fire retardancy to the thermoplastic polymers without deteriorating the useful properties of the thermoplastic polymers, they can be widely used in the field of inertia, construction and electric industries." In Column 1, lines 26–32, the patentee states: "—the compounds containing chlorine or bromine atoms to be used as fire retardant agents, are generally sublimated and therefore, the fire retardant agents are sublimated and lost in the process for producing fire-retardant polymers or in after-finishing processes; accordingly, deteriorations of fire-retardancy or difficulties in use tend to occur more often than not."

In Column 1, lines 39–44 the patentee states: "—the compounds containing chlorine or bromine atoms to be used as fire-retardant agents are unstable in most cases when exposed to ultraviolet rays." In Column 1, lines 59–64 the patentee states: "However, as a matter of fact, only very few fire-retardant polymers can be used in actual practice although they are said to have fire-retardant effects, because there are restrictions such as the conditions employed in production attributable to the properties of the fire-retardant agent, or to the properties of the polymers into which they are to be incorporated."

It can be seen, then, from the foregoing discussion and quoted subject matter that the field of flame retardancy is highly sophisticated, unpredictable and requires substantial research to produce an end product (plastic composition) which meets the necessary criteria for utilitarian purposes, particularly under the present day government standards. Thus, there is always a demand for a material which will function as a flame retardant in nylon and concurrently will not, by incorporation therein, adversely effect the chemical and/or physical and/or mechanical properties of the resultant nylon containing plastic composition (herein also referred to as "nylon plastic composition") and also have utility.

The prior art problem of providing a flame retarded nylon composition having desired chemical, physical and mechanical properties, in addition to functional utility, has now been substantially solved by the present invention and the above-described disadvantages substantially overcome.

Accordingly, one of the main objects of the present invention is to provide nylon plastic compositions which are flame retarded.

Another object of the present invention is to provide a unique three component system for nylon plastic compositions which will not substantially adversely effect the chemical and/or physical and/or mechanical properties of said compositions.

A salient object of the present invention is to provide a nylon plastic composition which has a certain defined flame retardancy property.

A further object of the present invention is to provide a flame retardant and an enhancing agent which are economical and easy to incorporate into nylon plastics without being degraded or decomposed as a result of normal blending or processing operations.

BRIEF DESCRIPTION OF THE INVENTION

It has been found that the foregoing objects can be obtained by the use of a unique three component system, which consists of (a) nylon (hereinafter defined), and (b) a certain bis-phenoxy compound (hereinafter defined), and (c) an enhancing agent (hereinafter defined) to subsequently provide flame retarded plastic compositions which exhibit outstanding chemical, physical and mechanical properties.

It is to be understood that the term "flame retarded" as used herein refers and is restricted to a limited definition and that is the reduction in flammability of the plastic composition which contains the three component system. The criticality of this flame retardancy is more specifically set forth herein, with particular reference being made to page 20 herein regarding UL-94 classification (sometimes referred to herein as "values").

DETAILED DESCRIPTION OF THE INVENTION

The particular bis-phenoxy compound used in the present invention compositions has the formula

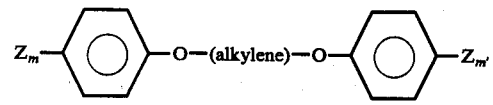

In Formula I above, Z is bromine, $m$ and $m'$ are each an integer having a value of 5, and alkylene is —$(CH_2)_2$—.

It is to be understood that only the following compound (Formula II) falls within Formula I above and as heretofore defined is described herein as "bis-phenoxy compound"

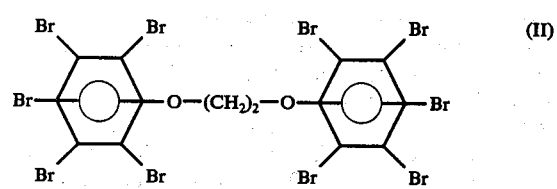

1,2-bis(2,3,4,5,6-pentabromophenoxy)ethane

The compound of Formula II above, designated as "bis-phenoxy compound," has been found to be uniquely suitable for nylon. However, it was surprising to find that "other bis-phenoxy compounds" were not found suitable in nylon as hereinafter disclosed in the examples. These "other bis-phenoxy compounds" include the following:

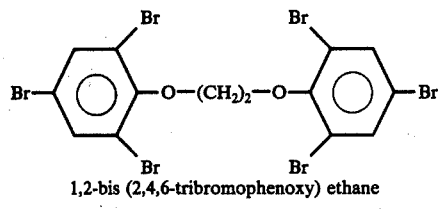
1,2-bis (2,4,6-tribromophenoxy) ethane (IV)

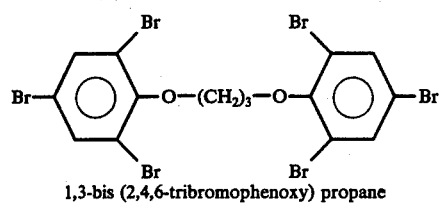
1,3-bis (2,4,6-tribromophenoxy) propane (V)

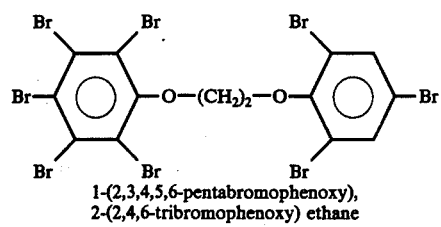
1-(2,3,4,5,6-pentabromophenoxy), 2-(2,4,6-tribromophenoxy) ethane

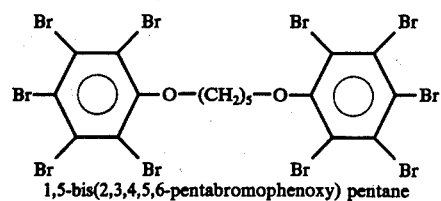
1,5-bis(2,3,4,5,6-pentabromophenoxy) pentane (VII)

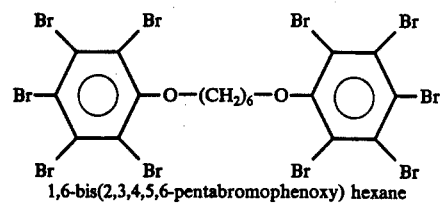
1,6-bis(2,3,4,5,6-pentabromophenoxy) hexane

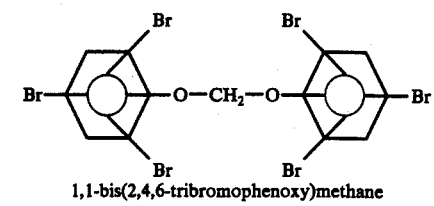
1,1-bis(2,4,6-tribromophenoxy)methane (IX)

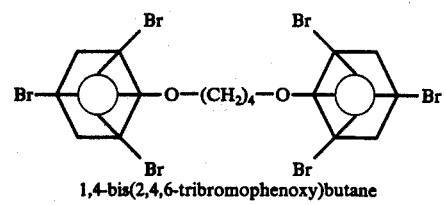
1,4-bis(2,4,6-tribromophenoxy)butane

It is to be specifically understood that those compounds of Formulae III thru IX do not fall within the term "bis-phenoxy compounds" (BPC) used herein, but do fall within the term "other bis-phenoxy compounds" (OBPC).

In general, the compounds BPC (and OBPC) are prepared by reacting a halogenated phenol with a halogenated alkane at elevated temperatures in the presence of a basic material such as alkali metal hydroxides, carbonates, bicarbonates, oxides and hydrides. The preferred alkali metals are potassium and sodium. Where one desires to increase, for example, ease of handling the reaction mass, solvents such as ketones (e.g. actone, methyl ethyl ketone, and methyl iso-butyl ketone), alcohols (e.g. methanol, ethanol, iso-propyl alcohol, butyl alcohol and glycols), or aqueous solvents (e.g. water, a mixture of water and alcohol and a mixture of water and ketone) can be employed. The desired end product i.e. the BPC and OBPC compounds, can be recovered from the reaction mass via various methods known to those skilled in the art. Where the end product requires recovery via crystallization, various aromatic solvents, such as benzene, toluene, xylene, dichlorobenzene and the like, can be used.

Specifically, the compounds BPC (and OBPC) are prepared accordingly to the following reactions:

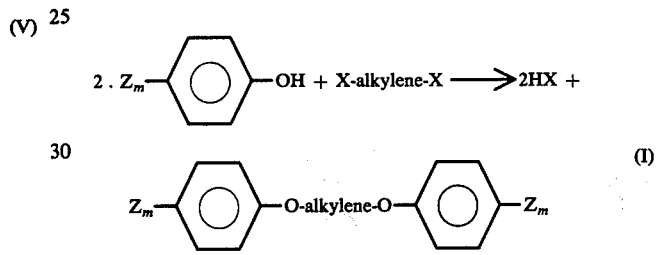

In the above reaction, X is halogen, preferably bromine, and alkylene is the same as herein defined.

The above reaction is conducted at temperatures ranging from the freezing point of the initial reaction mass to the boiling point hereof. Preferably the temperatures are from about 40° C to about 200° C and more preferably from about 50° C to about 175° C. It is to be understood that the reaction can be conducted under sub-atmospheric (e.g. 1/10–8/10 atmospheres) pressure. Preferably, the reaction is carried out at atmospheric pressure.

The above-described processes can be carried out with conventional, readily available chemical processing equipment. For example, a conventional glass-lined vessel provided with heat transfer means, a reflux condenser and a mechanical stirrer can be advantageously utilized in practicing any of the preferred embodiments of the invention described in preparing the BPC/OBPC examples set forth herein.

The amount of bis-phenoxy compound employed in the present invention compositions is any quantity which will effectively render, in conjunction with the enhancing agent, the nylon containing composition flame retardant. In general, the amount used is from about 1% to 25% by weight, based on the total weight of the composition. Preferably, the amount employed is from about 5% to about 20% by weight. It is to be understood that any amount can be used as long as it does not substantially adversely effect the chemical and/or physical and/or mechanical properties of the end plastic composition. The amount utilized, however, is such amount which achieves the objectives described herein.

The second component of the three component system, and which is critical therefor, are certain compounds which when used with the bis-phenoxy compounds promote a cooperative effect therebetween and thus enhance the flame retardancy of the resultant plastic composition as compared to the flame retardancy of either one component used separately. These "enhancing agents" comprise the oxides and halides of groups IVA and VA of the Periodic Table, i.e. oxides and halides of antimony, bismuth, arsenic, tin, lead, germanium, e.g. antimony oxychloride, antimony chloride, antimony oxide, stannic oxide, stannic chloride, arsenous oxide, arsenous chloride, and the like; and organic and inorganic compounds of phosphorus, nitrogen, boron, and sulfur, e.g., triphenyl phosphate, ammonium phosphate, zinc borate, thiourea, urea, stannic sulfide, and the like and oxides and halides of titanium, vanadium, chromium, manganese, iron, niobium, molybdenum copper, zinc, magnesium, e.g. titanium dioxide, titanium chloride, vanadanium pentoxide, chromic bromide, manganous oxide, molybdenum trioxide, ammonium molybdate; and hydrates of the above, e.g., stannic oxide hydrate, lead hydrate; and combinations thereof. The preferred enhancing agents are the oxides of antimony, arsenic and bismuth. However, any compound which on decomposition, as by ignition, yields these oxides would be suitable. Thus some organic antimonates are preferred. The enhancing agents disclosed in U.S. Pat. No. 3,205,196 are also suitable for use.

U.S. Pat. No. 3,205,196, column 2, states that "Antimony oxide is the antimony compound that is presently preferred for use in the present invention. However, many antimony compounds are suitable, inorganic antimony compounds include antimony sulfide sodium antimonite, potassium antimonite, and the like. Many organic antimony compounds are suitable such as the antimony salts of organic acids and their pentavalent derivatives disclosed in copending application Ser. No. 688,143, filed Oct. 4, 1957, now U.S. Pat. No. 2,996,528. Compounds of this class include antimony butyrate, antimony valerate, antimony caproate, antimony heptylate, antimony caprylate, antimony pelargonate, antimony caprate, antimony cinnamate, antimony anisate, and their pentavalent dihalide derivatives. Likewise the esters of antimonous acids and their pentavalent derivatives disclosed in copending application Ser. No. 688,108, filed Oct. 4, 1957, now U.S. Pat. No. 2,993,924, such as tris(n-octyl) antimonite, tris(2-ethylhexyl) antimonite, tribenzyl antimonite, tris($\beta$-chloroethyl)antimonite, tris($\beta$-chloropropyl) antimonite, tris($\beta$-chlorobutyl) antimonite and their pentavalent compounds are the cyclic antimonites such as trimethylolpropane antimonite, pentaerythritol antimonite, and glycerol antimonite. The corresponding arsenic and bismuth compounds can also be employed."

It is to be understood that such patents as U.S. Pat. No. 3,205,196; U.S. Pat. No. 2,996,528 and U.S. Pat. No. 2,993,924 are to be considered as incorporated herein by reference for all intents and purposes. Without limitation, preferred enhancing agents include $Sb_2O_3$, $SbCl_3$, $SbBr_3$, $SbI_3$, $SbOCl$, $As_2O_3$, $As_2O_5$, $ZnBO_4$, $BaB_2O_4 \cdot H_2O$, $2 \cdot ZnO \cdot 3B_2O_3 \cdot 3.5H_2O$ and stannic oxide hydrate. The more preferred enhancing agent is antimony trioxide.

The amount of enhancing agent employed in the present invention compositions is any amount which when used with said bis-phenoxy compound will promote a cooperative effect therebetween. In general, the amount employed is from about 0.5% to about 15%, preferably from about 1% to about 10%, by weight, based on the total weight of plastic composition. Higher or lower amounts can be used along as the desired end results are achieved.

The third critical component of the three component system is the nylon polymer. It is to be understood that the term nylon as used herein means any long chain synthetic polymeric amide which has recurring amide groups as an integral part of the main polymer chain. This term includes, without limitation, commercially available materials such as polycaprolactam (nylon 6); the polyamides which are derived from the condensation of a dicarboxylic acid with a diamine, such as polyhexamethylene adipamide (66 nylon) and polyhexamethylene sebacamide (610 nylon); and copolymers thereof which may be designated as 66/610/6 nylon, 66/610 nylon, 66/6 nylon, and the like, such as a copolymer of hexamethylene adipamide units and hexamethylene dodecamide units (66/612 nylon). This term also includes polyamide molding resins such as those disclosed in U.S. Pat. No. 2,071,250; U.S. Pat. No. 2,071,251; U.S. Pat. No. 2,130,523; U.S. Pat. No. 2,130,948; and U.S. Pat. No. 3,630,988. All of these publications are to be considered as incorporated herein by reference.

Thus the nylon used in the present invention compositions is any nylon herein defined and which one so desires to flame retard. It is to be understood that the nylon used can be a "virgin" material, i.e. substantially free of additives such as stabilizers, plasticizers, dyes, pigments, fillers, and the like, or the nylon can have additives (such as those mentioned and described herein) already contained therein or added concurrently with or after the addition of the bis-phenoxy compound and enhancing agents.

The bis-phenoxy compound and enhancing agents can be incorporated into the nylon at any processing stage in order to prepare the present invention plastic compositions. In general, this is undertaken prior to fabrication either by physical blending or during the process of forming nylon per se. Where one so desires, the bis-phenoxy compound and/or enhancing agents may be micronized into finely divided particles prior to incorporation into the nylon.

It is also within the scope of the present invention to employ other materials in the present invention compositions where one so desires to achieve a particular end result. Such materials include, without limitation, adhesion promoters; antioxidants; antistatic agents; antimicrobials; colorants; flame retardants such as those listed on pages 456–458, Modern Plastics Encyclopedia, ibid., (in addition to the new class of flame retardants described herein); heat stabilizers; light stabilizers; pigments; plasticizers; preservatives; ultraviolet stabilizers and fillers and additives.

In this latter category, i.e. fillers, there can be mentioned without limitation, materials such as glass; carbon; cellulosic fillers (wood flour, cork and shell flour); calcium carbonate (chalk, limestone, and precipitated calcium carbonate); metal flakes; metallic oxides (aluminum, beryllium oxide and magnesia); metallic powders (aluminum, bronze, lead, stainless steel and zinc); polymers (comminuted polymers and elastomerplastic blends); silica products (diatomaceous earth, novaculite, quartz, sand, tripoli, fumed colloidal silica, silica aerogel, wet process silica); silicates (asbestos, kaolimite, mica, nepheline syenite, talc, wollastonite, aluminum silicate and calcium silicate); and inorganic compounds such as barium ferrite, barium sulfate, molybdenum disulfide and silicon carbide.

The above mentioned materials, including filler, are more fully described in Modern Plastics Encyclopedia, ibid, and which publication is incorporated herein (in toto) by reference.

The amount of the above described materials employed in the present invention compositions can be any quantity which will not substantially adversely effect the desired results derived from the present invention compositions. Thus, the amount used can be zero percent, based on the total weight of the composition, up to that percent at which the composition can still be classified as a plastic. In general, such amount will be from about 0% to about 75% and more specifically from about 1% to about 50%.

With reference to the present invention plastic compositions described herein, one of the critical features thereof is the unusually high flame retardancy thereof. The significance of flame retardancy of plastic compositions is well recognized in the art as heretofor mentioned. However, recent developments in conjunction with the use of flame retardant plastic compositions as judged by the Consumer Product Safety Commission, require a UL-94 value (hereinafter discussed) of V-0 in order to produce a commercially acceptable article of manufacture. The Consumer Product Safety Commission is continuing to set mandatory standards in the field where the plastic compositions are utilized and since about 1970 have increased the criticality of the UL value of plastic compositions. In reacting to the Consumer Product Safety Commission's mandatory standards in this area, the producers of (plastic composition) articles of manufacture are now requiring that said articles have a V-0 value in order to meet new mandatory standards which are anticipated to be activated by federal legislation shortly. Thus, the significance of a plastic composition having a V-0 value is well recognized in the art; note MODERN PLASTICS, September 1974, pages 74–77, December, 1974, page 20, and December, 1975, pages 42–44, 48–50 and 59, and which publications are to be considered as incorporated herein by reference.

In conjunction with the present invention plastic compositions described herein, an important feature thereof is the light stability thereof. The significance of light stability of plastic compositions is recognized in the art, e.g. the publication entitled "The Measurement of Appearance" by Mr. Richard S. Hunter (Hunter Associates Laboratory, Inc., 9529 Lee Highway, Fairfax, Virginia) 1973. Mr Hunter has been associated with the efforts of defining appearance and color since the 1930's and was for many years an associate of Gardner who is another authority in this field. The following paragraphs from Mr. Hunter's book are set forth in order to demonstrate this light stability significance.

The Judd-Hunter system "of scales for color difference was based on Judd's uniform chromaticity scales triangle. Judd made an instrumental study of a number of woolen swatches rated by dyers for their acceptability as commercial color matches to standard. The NBS unit of color difference was designed by Judd to be the maximum difference commercially acceptable in the textile trade as represented by there dyers at the time when the study was carried out (Judd, 1939). The NBS Unit generally referred to today is not Judd's 1939 unit, but the Hunter 1942 version of the Judd unit with 100 units falling between black and white."

"Since 1942 this unit has been used in terms of a number of the opponent color scales. In a color scale which is already uniform in its visual spacing of lightness and chromaticity, and which has 100 units between black and white as well as rectangular coordinates for chromaticity, color difference in approximate NBS units can be specified in units of that system. The color difference becomes the distance between the two colors in that color space. With rectangular coordinates, the formula is:

$$\Delta E = \sqrt{\Delta L^2 + \Delta a^2 + \Delta b^2}$$

Similarly if only the chromaticity component of difference is desired, the formula is:

$$\Delta C = \sqrt{\Delta a^2 + \Delta b^2}."$$

"Following Judd's proposed unit of color difference, Hunter proposed the measurement of much the same quantity by a photoelectric tristimulus method in 1942. In the next year, Scofield proposed a quantity which was quite a bit easier to compute. Scofield used the reciprocal of the square root of reflectance instead of the reciprocal of the fourth root of reflectance as a multiplier in adjusting reflectance values for uniform lightness scale intervals. This is the only difference between the Scofield and the Judd-Hunter formulas for color difference. (Scofield, (1943))."

"In 1948, Hunter started to develop a tristimulus instrument which would read chromaticity dimensions of opponent colors directly. He was seeking to improve the precision and usefulness of results of the tristimulus reflectometers previously used. The $R_d$ scales developed in the period 1948 and 1950 did not have a uniform lightness readout but did have direct reading visually uniform $a$ and $b$ scales. The L scales, in which there is approximate perceptual uniformity in all three dimensions, were created in the period 1950–1952 but were not described in a formal publication until 1958. These two sets of Hunter Color Difference Meter scales enjoy wide use because of the fact that they can be read directly from a tristimulus instrument with high precision, and offer instrumental computation of color difference by the $\Delta E$ formula given above."

"NBS Unit of Color Difference is defined as: the unit of color difference of the National Bureau of Standards. The unit is about four times as great as the smallest difference observable under ideal conditions. Differences of less than one unit are usually not important in commercial transactions. In Munsell terms, one NBS unit is equivalent to about 0.1 Value step, 0.15 Chroma step, or 2.5 Hue step at Chroma 1."

"Hunter further investigated the use of L', $\alpha'$, $\beta'$ for color difference measurement. He recognized at this time (which no other color-difference scale before or since has recognized) that perceived color difference will depend on the proximity of the specimens compared and on their glossiness. Accordingly, the 1942 Hunter color difference equation includes factors to account for these variables. It is this equation, with selected constants, that defines the widely used NBS unit of color difference."

"High precision is almost always essential for useful color difference measurements. Only with precise instruments is it possible to measure color differences as small as those the eye can see. Instrument accuracy is also normally a requisite because spectrally inaccurate instruments, even though precise, will give visually inaccurate color difference measurements wherever there are spectral differences between the specimens involved. The ease of obtaining and interpreting values of color difference is another factor which may affect the selection of a procedure."

"Twenty years ago, color difference scales were in demand to serve as a basis for setting one-number tolerances for fading and acceptability of matches. The Index of Fading and NBS unit were used as units."

"Today, the concept of color difference is more refined. One number tolerances are seldom used. Instead, color difference tolerances are designed as boundaries in color space within which acceptable colors must fall. The boundaries do not necessarily correlate with perceptibility of difference but rather with the limits of acceptability. The standard color, furthermore, may not be in the center of the bounded region but may be displaced to one side. For example, where subsequent yellowing may occur, the tolerance for the yellow-blue dimension might be $+0.1$, $-0.8$ units."

"Color difference specifications are tighter today and tolerances are smaller. The specification usually treats the color dimensions separately so that a complete specification would contain nine numbers: The three numbers that describe the desired color, and the six numbers that describe the individual plus and minus tolerances. Such tolerances can be reduced to graphs which not only show acceptability but provide a guide to the formulation correction needed to correct an off shade. When the question of acceptability becomes a question of sorting objects according to shade, a graphical chart showing the classification of color values can be quite helpful."

"Although color measurements are frequently used for identification, sorting and recording of color values, the primary uses of tristimulus instruments all involve measurements of fairly small color differences. The most frequent uses of these small color difference measurements are to establish closeness to standard and to give guidance for the adjustment of color mismatches. They are also used in the study of deterioration in a product as a result of exposure and use."

"Spectrophotometers and tristimulus instruments made up the majority of color appearance measuring instruments in use in industry. Spectrophotometers give wavelength-by-wavelength analyses of the reflecting properties of objects, while tristimulus instruments by the use of filters which approximate the Standard Observer functions of the eye, give measurements of color in X, Y, Z terms, or in L, a, b values. Spectrophotometers are essential where color formulation is involved, and metamerism must be comtrolled. However, tristimulus colorimeters and reflectometers provide precise and less expensive means for the routine measurement of color and adjustment of small color differences."

In view of the foregoing quoted subject matter, it can thus be seen that a change in $\Delta E$ value of 1 unit constitutes a real change. Note also Japanese patent application (publication 122,456 of 1974) which shows that achieving a color change in $\Delta E$ of only 2.3 is significant as it pertains to a polycarbonate polymeric composition; (this value is substantially the same as those $\Delta E$ values obtained in polycarbonate tests and which results thereof are shown in Table V herein, i.e. 2.3 versus 2.5 over the control). Both of these publications (i.e. the Japanese Pat. No. 122,456 and the Hunter book) are to be considered as incorporated herein by reference. It is to be noted also that a lower $\Delta E$ value is more desired and the higher $\Delta E$ value is least desired. This $\Delta E$ value is not ab abstract value, however, since one must compare it with the $\Delta E$ values of the "control" plastic composition. One of the desired $\Delta E$ values would be where both the $\Delta E$ values of the "control" plastic composition "without additives"-(i.e. without flame retardant and enhancing agent) and the plastic composition with said additives are substantially the same or the latter has a lower value.

EXAMPLES

(INCLUDING COMPARATIVE DATA)

The following examples are presented to demonstrate the uniqueness of the present invention compositions as contrasted to other plastic compositions containing the same (present invention) bis-phenoxy compounds (BPC), "other bis-phenoxy compounds" (OBPC) and prior art compounds with or without an enhancing agent. These examples also show unpredictability, via the end results, in using any halogenated material, much less the same material, in several different plastics.

Referring to Example I, this example sets forth the comparison of a commercially available nylon plastic with seven other polymer systems and includes substantial detail with particular reference to physical properties including flammability.

Referring to Example II, this compares a nylon plastic, having incorporated therein the "other bis-phenoxy compounds" (Formulae III and IV, page 11), and an enchancing agent with four other polymers containing the same "other bis-phenoxy compounds" and enhancing agent. The four comparative polymers are polyacrylonitrile, acrylonitrile-butadiene-styrene (ABS), polypropylene and polymethylmethacrylate. As will be seen from the results hereinafter set forth, four of the five polymers had no flame retardant efficacy when incorporating the "other bis-phenoxy compounds" (OBPC) and enhancing agents, whereas the ABS system did, utilizing certain OBPC compounds, and so demonstrates the unpredictability of any material in any polymer system, particularly a related material in different polymer systems, i.e. OBPC compounds (Formulae III and IV) in nylon.

Specifically and in conjunction with the results set forth in Table II, it can be seen that while certain "other bis-phenoxy compounds" (Formulae III and IV, page 11) were effective in an ABS system, these same compounds were not effective in a nylon polymer.

The results, thus, are another indication of the unpredictability of additives in polymer systems and correspond to the subject matter set forth in "Modern Plastic Encyclopedia", ibid., regarding the use of octabromobiphenyl in one polymer but not shown for use (or functionally equivalent) in numerous other materials.

EXAMPLE I

Solid samples of eight different plastic compositions separately containing certain prior art compounds, a present invention bis-phenoxy compound and "other bis-phenoxy compounds", all with or without the herein described enhancing agents, are prepared according to the procedure set forth hereinafter, and are subjected to the following tests in order to ascertain comparative properties of the resultant plastic compositions:

| | | |
|---|---|---|
| (1) Flammability | | |
| (a) Oxygen Index, O.I. | ASTM Test No. D-2863-70 | |
| (b) UL-94 | UL-94 Procedure described herein and dated February 1, 1974. | |
| (2) Light Stability (Weather Ometer) | | |
| (a) Visual rank (1 is the highest) | Procedure described hereinafter | |
| (b) Gardner Colorimeter ("ΔE"Values) | | |
| (3) Initial Color | Visual color observation immediately after injection molding. | |
| (4) Visual Migration | Visual observation of surface haze presence. | |
| (5) TGA and Isotherm | Procedure described hereinafter. | |
| (6) Melt Flow | ASTM Test No. 1238-70. | |
| (7) Notched Izod Impact | ASTM Test D256-72a; and | |
| (8) Heat Distortion Temperature (HDT) | ASTM Test No. D648-72. | |

Regarding item (a) above, i.e. light stability, the results obtained via the "Visual" rank include any color changes which occurred in the molded materials tested from a combination of processing and exposure to the xenon arc.

Each of the aforementioned Tests is a standard test in the art and are utilized collectively in order to ascertain the efficacy of a polymeric system as an overall flame retardant composition for commercial application. All of these Tests are to be considered as incorporated herein by reference.

The different polymers utilized along with trade names and corresponding suppliers are listed below.

| Polymer | Trademark | Supplier |
|---|---|---|
| Nylon 6 | Zytel 211 | DuPont |
| ABS | Cycolac T-2098 | Borg-Warner |
| Polycarbonate | Lexan 141 | General Electric |
| Polyethylene, Low Density (LDPE) | Baeklite DPDd-3900 | Union Carbide |
| Polypropylene | Profax 6523 | Hercules |
| Terephthalate polyester | Valox 310 | General Electric |
| Polyphenylene oxide, modified (PPO) | Noryl 731 | General Electric |
| Polystyrene (high impact) HIPS | TMDE-6500 | |

The concentration of the additives (i.e. prior art compounds (designated PAC), present invention bis-phenoxy compound (designated BPC) or "other bis-phenoxy compounds" (designated OBPC), with or without an enhancing agent (designated EA) and the respective Table Nos. listing the pertinent data are shown below. The Table numbers are shown in parenthesis.

| PAC (Letter) | FORMULA |
|---|---|
| A | Chd 6Cl$_5$C$_6$Cl$_5$ decachlorobiphenyl |
| B | C$_6$Br$_4$OC$_6$Br$_5$ Bis-(pentabromophenyl)ether |
| C | C$_6$Br$_6$ Hexabromobenzene |
| D | C$_6$Br$_5$CH$_2$Br Pentabromobenzyl bromide |
| E | C$_6$H$_2$Br$_2$(OCH$_3$)C(CH$_3$)$_2$C$_6$H$_2$Br$_2$(OCH$_3$) Bis:2,2-(3,5-dibromo-4-methoxyphenyl)propane |
| F | C$_6$H$_2$Br$_3$OCH$_2$CB4=CBrCH$_2$OC$_6$H$_2$Br$_3$ Trans 1,4-Bis(2,4,6-tribromophenoxy)-2,3-dibromo-2-butene |

The present invention bis-phenoxy compound (BPC) listed in the Tables under Present Invention as II corresponds to that compound listed on page 10 of this specification.

The "other bis-phenoxy compounds" (OBPC) listed in the Tables under such title, as III through IX, correspond to those compounds listed on pages 11, 12, and 13 of this specification.

The control (base resin) is the particular designated polymer without the PAC, BPC, OBPC, or EA.

The plastic materials which are subject to the above described tests, are prepared in the following manner. With the exception of "base resin", the particular additive (PAC, OBPC or BPC, and the antimony trioxide enhancing agent where indicated) is incorporated into the plastic by adding both to a Brabender mixer ("Plastic-Corder", Torque Rheometer, Model PLV-150, C. W. Brabender Instruments Inc., South Hackensack, N.J.). The mixer is equipped with a pair of roller type blades positioned within a head provided with heat transfer means.

The resultant mixture is heated to about 245° C.; at this temperature, it is in a molten state. The percentages by weight of each component utilized in the respective formulations are listed in the Tables. Each formulation is discharged from the mixer and upon cooling solidifies and is ground into chips. The chips are subjected to injection molding in a one (1) ounce Newbury Injection Molder, Model HI 30 RS, manufactured by Newbury Industries, Inc., Newbury, Ohio by placing said chips therein and utilizing a 60 second molding cycle with a ram pressure of 2000 psi. The chips contained in said molder are subjected to heat transfer means supplied thereto in order to melt said chips, and the melted chips are then rammed into a mold in order to provide solid samples (after cooling) for testing.

Portions of the solid samples of each respective for-

| Polymer | PAC, BPC or OBPC/EA--Sb$_2$O$_3$% | ONLY PAC, BPC or OBPC |
|---|---|---|
| Nylon | 12/4 (I) | |
| ABS | 15/5 (II) | 20/0(III) + 30/0(IV) |
| Polycarbonate | 3/1 (V) | |
| LDPE | 20/5 (VI) | |
| Polypropylene | 12/4 (VII) | |
| Polyester | 12/4 (VIII) | 16/0 (IX) |
| PPO | 9/3 (X) | |
| PPO | 9/3 Pigmented TiO$_2$ (XI) | |
| HIPS | 12/4 (XII) | 16/0(XIII) + 30/0(XIV) |

All percentages (%) shown are on a weight basis, based on the total weight of the plastic composition.

The identification of the prior art compounds (PAC) listed as A, B, C, D, E and F in the Tables are shown below:

mulation prepared according to the above described procedure are subjected to two different flammability tests, i.e. UL 94 and ASTM D-2863-70. The UL 94 is, in general, the application of a burner to a test specimen (strip) for a certain period of time and observation of combustion, burning, and extinguishment. This procedure is fully set forth in Underwriters' Laboratories bulletin entitled UL 94, Standard for Safety, First Edition, September 1972 and which is incorporated herein by reference. ASTM No. D-2863-70 is a flammability test which correlates the flammability of a plastic specimen to the available oxygen in its immediate environment; this correlation is stated as an Oxygen Index, O.I., lever predicted upon the percent oxygen in the gaseous medium which is required to just provide a steady state of continuous burning of the plastic specimen. This ASTM method is fully described in 1971 Annual Book of ASTM Standards-Part 27, published by the American Society for Testing and Materials, 1916 Race Street, Philadelphia, Pa.; this publication is to be considered as incorporated (in toto) herein by reference. The UL 94 test is the more critical test as it is the test generally used to determine the suitability of thermoplastics for commercial applications.

Samples of each formulation are subjected to temperature (thermal) stability tests via the use of thermal gravimetric analysis (TGA). This test employs the use of a "Thermal Balance", model TGS-1, Perkin-Elmer Corporation, Norwalk, Connecticut and an electrical balance, Cahn 2580 model, Cahn Instrument Company, Paramount, California. The conditions of this TGA test are listed in the following Tables.

Samples of each formulation are also subjected to light stability tests via the use of a "Weather-Ometer", model 25/18 W. R., Atlas Electrical Devices Company, Chicago, Illinois. Utilizing an operating temperature of 145° F and a 50% relative humidity, each sample is subjected to the indicated number of hours of "simulated daylight" via the use of a Xenon arc. This Test shows whether there is any significant discoloration in any sample tested and the end results are set forth in Δ E values.

The results of all of this comparative testing are shown in Tables I through XIV.

Table I

| Resin<br>Additive | Nylon 6<br>12/4 | Control<br>(Base<br>Resin) | Prior Art Compounds | | | | | | Other Bis-phenoxy Compounds | | | Present Invention Compound |
|---|---|---|---|---|---|---|---|---|---|---|---|---|
| | | | A | B | C | D | E | F | III | IV | VII | II |
| Oxygen Index, % at 73° F | | 21.5 | 26.0 | 28.5 | 29.0 | | | | 24.5 | | | 27.5 |
| UL-94 ⅛" thickness | | HB | V-2 | V-0 | V-2 | | | | V-2 | | | V-0 |
| Xenon Arc Weather-Ometer (Ranked) | | | | | | Did Not Mold | Decomposed | Did Not Mold | | Moulding Problems | Decomposed | |
| Injection Molded Initial Color | | Natural (white) | Cream | Cream | Cream | | | | Off-White | Decomposed | During Moulding | Cream |
| Visual Migration χ Initial | | | None | None | None | | | | None | | | None |
| χ 7 days | | | None | None | None | | | | None | | | None |
| TGA 5% wt. loss ° C | | 237 | 219 | 219 | 204 | | | | 214 | | | 220 |
| Isotherm 48 hr. 150° C | | 5.67 | 4.70 | 4.60 | 4.76 | | | | 4.49 | | | 4.97 |
| Melt Flow g/10 min. Conditions "G" 200° C 5000g | | | | | | | | | | | | |
| Notched Izod Impact ft.lbs/in. ⅛ × ⅛ | | 3.09 | 1.85 | 1.66 | 1.60 | | | | 2.54 | | | 2.20 |
| Heat Deflection Temp. ° F at 264 psi, Annealed at 100° F | | 125 | 137 | 133 | 135 | | | | 132 | | Decomposed During Moulding | 136 |
| Concentrate Compounding Temperature, ° F | | | 440 | 440 | 440 | 440 | | | 440 | | | 440 |
| Injection Molding Temperature, ° F | | 480 | 480 | 480 | 480 | 450 | | | 480 | | | 480 |
| Gardner Color Value, Δ E After 100 hours, Xenon Arc | | 0.9 | 2.0 | 3.7 | 2.5 | | | | 2.4 | | | 7.9 |

Table II

| Resin ABS<br>Additive 15/5 | Control<br>(Base<br>Resin) | Prior Art Compounds | | | | | |
|---|---|---|---|---|---|---|---|
| | | A | B | C | D | E | F |
| Oxygen Index, % at 73° F | 18.5 | 21.5 | 28.0 | 27.5 | 35.0 | 26.0 | 34.5 |
| UL-94 ⅛" thickness | HB | HB | V-0 | V-0 | V-0 | HB | V-0 |
| Xenon Arc Weather-Ometer (Ranked) | 5 | 6 | 12 | 10 | 13 | 3 | 11 |
| Injection Molded Initial Color | White | Off-White | Off-White | Off-White | Tan | Off-White | Light Cream |
| Visual Migration χ Initial | | None | None | None | None | None | None |
| χ 7 days | | None 266 | None | None | None 249 | None | None |
| TGA 5% wt. loss ° C | 329 | 48 hr. | 307 | 48 hr. | 261 | 271 | 274 |
| Isotherm 72 hr., 150° C | 1.83 | 0.415 | | 0.727 | | | 1.27 |
| Melt Flow g/10 min. Conditions "G" 200° C, 5,000g | 3.2 | 3.6 | 4.0 | 4.5 | 8.3 | 9.9 | 4.9 |
| Notched Izod Impact ft. lbs/in. ⅛ × ⅛ | 3.27 | 1.62 | 1.40 | 1.19 | 1.56 | 1.62 | 1.23 |
| Heat Deflection Temp. ° F at 264 psi Annealed at 180° F | 192 | 189 | 187 | 190 | 184 | 171 | 185 |
| Concentrate Compounding Temperature, ° F | | 400 | 400 | 400 | 400 | 400 | 400 |
| Injection Molding Temperature, ° F | 450 | 450 | 450 | 450 | 450 | 450 | 430 |
| Gardner Color Value, Δ E After 100 hours, Xenon Arc | 6.5 | 3.9 | 20.1 | 11.9 | 12.7 | 4.6 | 8.6 |

Table II-continued

| Resin ABS Additive 15/5 | Other Bis-phenoxy Compounds | | | | | | Present Invention BPC |
|---|---|---|---|---|---|---|---|
| | III | IV | IX | V | VIII | VII | II |
| Oxygen Index, % at 73° F | 30.5 | 28.0 | 30.0 | 31.0 | 36.0 | 33.5 | 30.5 |
| UL-94 ⅛" thickness | V-0 | V-0 | V-0 | V-0 | V-0 | V-0 | V-0 |
| Xenon Arc Weather-Ometer (Ranked) | 7 | 8 | 4 | 2 | 1 | | 9 |
| Injection Molded Initial Color | White | White | White | White | White | White | White |
| Visual migration χ Initial | None | None | | | | None | None |
| χ 7 days | None | None | | | | None | None |
| TGA 5% wt. loss °C | 285 | 290 | | | | 307 | 310 |
| Isotherm 72 hr., 150° C | 1.11 | | | | | | |
| Melt Flow g/10 min. Conditions "G" 200° C, 5,000g | 8.2 | 6.7 | | | | 4.6 | 3.4 |
| Notched Izod Impact ft. lbs/in. ⅛ × ½ | 1.93 | 2.12 | 1.32 | 2.08 | 1.92 | 2.20 | 1.19 |
| Heat Deflection Temp. ° F at 264 psi Annealed at 180° F | 180 | 176 | | | | 186 | 190 |
| Concentrate Compounding Temperature, ° F | 450 | 350 | 400 | 400 | 400 | 400 | 400 |
| Injection Molding Temperature, ° F | 450 | 450 | 450 | 450 | 450 | 450 | 450 |
| Gardner Color Value, Δ E After 100 hours, Xenon Arc | 6.7 | 7.9 | 1.1 | 0.9 | 4.1 | 11.6 | 7.3 |

Table III

| Resin ABS Additive 20/0 | Control (Base Resin) | Prior Art Compounds | | | | | | Other Bis-phenoxy Compounds | | | Present Invention Compound |
|---|---|---|---|---|---|---|---|---|---|---|---|
| | | A | B | C | D | E | F | III | IV | VII | II |
| Oxygen Index, % at 73° F | 18.5 | 20.5 | 24.5 | 24.0 | 27.0 | 22.5 | | 24.0 | 22.5 | 25.0 | 27.0 |
| UL-94 ⅛" thickness | HB | HB | HB | V-0 | V-0 | HB | | HB | HB | HB | V-0 |
| Xenon Arc Weather-Ometer (Ranked) | 1 | 5 | 7 | 6 | 8 | 1 | | 2 | 3 | | 4 |
| Injection Molded Initial Color | white | Off-White | Off-White | Off-White | Tan | white | Decomposed | White | White | White | Off-White |
| Visual Migration χ Initial | | None | None | None | None | None | | None | None | None | None |
| χ 7 days | | | | | | | | | | | |
| TGA 5% wt. loss °C | | | | | | | | | | | |
| Isotherm 72 hr., 150° C | | | | | | | | | | | |
| Melt Flow g/10 min. Conditions "G" 200° C, 5,000g | | | | | | | | | | | |
| Notched Izod Impact ft. lbs/in. ⅛ × ½ | 3.27 | 1.40 | 1.43 | 1.17 | 1.15 | 1.97 | | 3.27 | 4.18 | 3.52 | 1.45 |
| Heat Deflection Temp. ° F at 264 psi, Annealed at 180° F | | | | | | | | | | | |
| Concentrate Compounding Temperature, ° F | | 400 | 400 | 400 | 400 | 400 | 400 | 400 | 400 | 400 | 400 |
| Injection Molding Temperature, ° F | 450 | 450 | 450 | 450 | 420 | 450 | | 450 | 450 | 450 | 450 |
| Gardner Color Value, Δ E After 100 hours, Xenon Arc | 6.5 | 8.0 | 19.8 | 11.1 | 8.5 | 4.6 | | 4.4 | 5.2 | 11.4 | 5.6 |

Table IV

| Resin ABS Additive 30/0 | Control (Base Resin) | Prior Art Compounds | | | | | | Other Bis-phenoxy Compounds | | | Present Invention Compound |
|---|---|---|---|---|---|---|---|---|---|---|---|
| | | A | B | C | D | E | F | III | IV | VII | II |
| Oxygen Index, % at 73° F | 18.5 | 21.5 | 30.0 | 30.0 | 32.0 | 27.0 | 30.0 | 33.5 | 34.0 | 38.5 | 35.5 |
| UL-94 ⅛" thickness | HB | HB | V-0 | V-0 | V-0 | V-0 | V-0 | V-0 | V-0 | V-0 | V-0 |
| Xenon Arc Weather-Ometer (Ranked) | 3 | 5 | 10 | 8 | 11 | 1 | 7 | 4 | 2 | 9 | 6 |
| Injection Molded Initial Color | White | Egg Shell White | Egg Shell White | Egg Shell White | Light Brown | White | Light Tan | White | White | | Egg Shell White |
| Visual Migration χ Initial | | | | | | | | | | | |
| χ 7 days | | | | | | | | | | | |
| TGA 5% wt. loss °C | | | | | | | | | | | |
| Isotherm 72 hr., 150° C | | | | | | | | | | | |
| Melt Flow g/10 min. Conditions "G" 200° C, 5,000g | | | | | | | | | | | |
| Notched Izod Impact ft. lbs/in. ⅛ × ½ | 3.27 | 1.06 | 1.08 | 1.09 | 1.50 | 1.42 | 1.19 | 2.49 | 3.65 | 2.46 | 1.13 |
| Heat Deflection Temp. ° F at 264 psi, Annealed at 180° F | | | | | | | | | | | |
| Concentrate Compounding Temperature, ° F | — | 440 | 440 | 440 | 392 | 392 | 356 | 440 | 400 | 410 | 440 |
| Injection Molding Temperature, ° F | 450 | 450 | 450 | 450 | 400 | 430 | 400 | 450 | 450 | 430 | 450 |
| Gardner Color Value, Δ E | | | | | | | | | | | |

Table IV-continued

| Resin | ABS | Control (Base Resin) | Prior Art Compounds | | | | | | Other Bis-phenoxy Compounds | | | Present Invention Compound |
|---|---|---|---|---|---|---|---|---|---|---|---|---|
| Additive | 30/0 | | A | B | C | D | E | F | III | IV | VII | II |
| After 100 hours, Xenon Arc | | 6.5 | 1.4 | 9.0 | 2.6 | 6.5 | 1.6 | 2.5 | 2.6 | 1.2 | 3.4 | 0.8 |

Table V

| Resin | Polycarbonate | Control (Base Resin) | Prior Art Compounds | | | | | | Other Bis-phenoxy Compounds | | | Present Invention Compound |
|---|---|---|---|---|---|---|---|---|---|---|---|---|
| Additive | 3/1 | | A | B | C | D | E | F | III | IV | VII | II |
| Oxygen Index, % at 73° F | | 25.0 | 36.5 | 41.5 | 39.5 | 37.0 | | 36.5 | 37.5 | 40.0 | 40.0 | |
| UL-94 ⅛" thickness | | HB | V-2 | V-0 | V-2 | V-2 | V-0 | | V-0 | V-0 | V-0 | V-0 |
| Xenon Arc Weather-Ometer (Ranked) | | 1 | 5 | 10 | 8 | 9 | 3 | | 2 | 4 | 6 | 7 |
| Injection Molded Initial Color | | Clear | Light Cream Perhaps | Light Cream | Light Cream | Cream | Light Cream | Decomposition | Off-White Perhaps | Cream | Off-White Perhaps | Off-White |
| Visual Migration χ Initial | | | Slight | None | None | None | None | | Slight | None | Slight | None |
| χ 7 days | | | None | None | None | None | None | | None | None | None | None |
| TGA 5% wt. loss ° C | | 427 | 381 | 379 | 375 | 366 | 378 | | 398 | 374 | 381 | 388 |
| Isotherm 24 hr. 200° C | | 0.394 | 1.20 | 0.529 | 1.78 | 1.18 | 1.12 | | 0.664 | 0.655 | 0.388 | 0.326 |
| Melt Flow g/10 min. Conditions 275° C, 1,200g | | 9.8 | 11.8 | 12.7 | 18.8 | 17.2 | 16.8 | | 8.8 | 17.4 | 12.2 | 11.4 |
| Notched Izod Impact ft. lbs/in. ½ × ⅛ | | 16.50 | 6.64 | 8.54 | 2.73 | 1.02 | 3.16 | | 16.98 | 7.25 | 11.45 | 9.41 |
| Heat Deflection Temp. ° F at 264 psi, Annealed at 200° F | | 279 | 265 | 267 | 260 | 259 | 262 | | 265 | 259 | 265 | 268 |
| Concentrate Compounding Temperature, ° F | | | 500 | 480 | 480 | 500 | 500 | Degraded at 500 | 500 | 500 | 500 | 500 |
| Injection Molding Temperature, ° F | | 520 | 520 | 520 | 520 | 520 | 520 | | 520 | 520 | 520 | 520 |
| Gardner Color Value, Δ E After 48 hours, Xenon Arc | | 1.1 | 4.7 | 22.2 | 10.1 | 6.7 | 3.8 | | 3.6 | 3.6 | 12.4 | 9.6 |

Table VI

| Resin | LDPE | Control (Base Resin) | Prior Art Compounds | | | | | | Other Bis-phenoxy Compounds | | | | Present Invention BPC |
|---|---|---|---|---|---|---|---|---|---|---|---|---|---|
| Additive | 20/5 | | A | B | C | D | E | F | III | IV | IX | VII | II |
| Oxygen Index, % at 73° F | | 18.0 | | 28.0 | 29.0 | 27.0 | 26.5 | 26.5 | 26.0 | 28.0 | 25.5 | 27.5 | 26.5 |
| UL-94 ⅛" thickness | | HB | | V-0 | V-2 | V-2 | V-2 | V-2 | V-2 | V-0 | V-2 | V-2 | V-0 |
| Xenon Arc Weather-Ometer (Ranked) | | | | | | | | | | | | | |
| Injection Molded Initial Color | | Natural | | Off-White | Light Grey | Off-White | White | Cream | White | White | | Off-White | White |
| Visual Migration χ Initial | | | | None | Yes | Yes | None | None | None | Yes | | None | None |
| χ 7 days | | | | None | Yes | Yes | None | Yes | None | Yes | | None | None |
| TGA 5% wt. loss ° C | | 302 | | 330 | 248 | 248 | 265 | 267 | 305 | 308 | | 339 | 332 |
| Isotherm 48 hr. 150° C | | 0 | | 0 | 1.84 | 2.42 | 0.78 | 0.66 | 0.26 | 0.41 | | 0.34 | 0.16 |
| Melt Flow g/10 min. Conditions "G" 200 C 5000g | | | | | | | | | | | | | |
| Notched Izod Impact ft. - lbs/in. ½ × ⅛ | | NB >6.6 | | NB >7.1 | NB >7.9 | 3.31 | NB >7.3 | NB >8.3 | 2.12 | NB >8.8 | NB | 3.00 | NB 8.1 |
| Heat Deflection Temp. ° F at 264 psi Annealed at 180° F | | | | | | | | | | | | | |
| Concentrate Compounding Temperature, ° F | | 400 | | 400 | 400 | 400 | 400 | 400 | 450 | 400 | 400 | 400 | 400 |
| Injection Molding Temperature, ° F | | 430 | | 450–410 | 410 | 410 | 410 | 410 | 410 | 410 | 410 | 410 | 430 |
| Gardner Color Value, Δ E After 100 hous, Xenon Arc | | 0.4 | | 9.8 | 8.5 | 4.4 | 2.1 | 7.5 | 3.9 | 1.3 | 2.4 | 6.2 | 3.0 |

Table VII

| Resin | Polypropylene | Control (Base Resin) | Prior Art Compounds | | | | | | Other Bis-phenoxy Compounds | | | Present Compound |
|---|---|---|---|---|---|---|---|---|---|---|---|---|
| Additive | 12/4 | | A | B | C | D | E | F | III | IV | VII | II |
| Oxygen Index, % at 73° F | | 17.5 | 21.0 | 24.0 | 25.0 | 24.0 | 20.5 | 31.5 | 21.5 | 23.5 | 23.5 | 23.0 |
| UL-94 ⅛" thickness | | HB | HB | V-2 | HB | V-2 | HB | V-0 | HB | V-2 | HB | HB |
| Xenon Arc Weather-Ometer (Ranked) | | 1 | 4 | 11 | 9 | 10 | 5 | 8 | 3 | 2 | 7 | 6 |
| Injection Molded Initial Color | | Clear | Off-White Perhaps | Off-White Perhaps | Cream | Cream | Off-White Perhaps | Cream | Off-White Perhaps | Off-White Perhaps | Cream | Off-White |
| Visual Migration χ Initial | | | Slight | Perhaps | None | None | Slight | | Slight | Slight | None | None |

Table VII-continued

| Resin Additive | Polypropylene 12/4 | Control (Base Resin) | Prior Art Compounds | | | | | | Other Bis-phenoxy Compounds | | | Present Compound |
|---|---|---|---|---|---|---|---|---|---|---|---|---|
| | | | A | B | C | D | E | F | III | IV | VII | II |
| χ 7 days | | | Perhaps Slight | Slight None | None | None | None | | Perhaps Slight | Perhaps Slight | None | None |
| TGA 5% wt. loss °C | | 272 | 264 | 274 | 256 | 252 | 260 | 269 | 275 | 273 | 281 | 276 |
| Isotherm 48 hr. 150° C | | 0.00 | 0.937 | 0.493 | 3.7 | 13.6 | 2.14 | 0.756 | 0.607 | 0.873 | 0.768 | 0.33 |
| Melt Flow g/10 min. Conditions "L", 230° C, 2,160g | | 0.20 5.2 g | 9.3 | 6.8 | 9.8 | 9.3 | 9.9 | 17.7 | 10.4 | 8.9 | 9.7 | 6.4 |
| Notched Izod Impact ft. lbs./in. ½ × ½ | | 1.22 | 1.19 | 1.21 | 1.12 | 1.16 | 1.13 | 1.10 | 0.96 | 1.07 | 1.07 | 1.20 |
| Heat Deflection Temp. °F at 66 psi, Annealed at 194° F | | 246 | 253 | 240 | 276 | 240 | 235 | 267 | 267 | 257 | 262 | 277 |
| Concentrate Compounding Temperature, °F | | | 400 | 420 | 400 | 360 | 450 | 420 | 400 | 400 | 450 | 400 |
| Injection Molding Temperature, °F | | 440 | 440 | 440 | 440 | 440 | 440 | 400 | 440 | 440 | 440 | 440 |
| Gardner Color Value, Δ E After 48 hours, Xenon Arc | | 0.5 | 5.3 | 12.8 | 10.0 | 8.8 | 5.6 | 7.3 | 2.7 | 2.7 | 8.0 | 4.8 |

Table VIII

| Resin Additive | Polyester 12/4 | Control (Base Resin) | Prior Art Compounds | | | | | | Other Bis-phenoxy Compounds | | | Present Invention Compound |
|---|---|---|---|---|---|---|---|---|---|---|---|---|
| | | | A | B | C | D | E | F | III | IV | VII | II |
| Oxygen Index, % at 73° F | | 22.0 | 28.0 | 32.0 | 32.0 | 32.0 | 26.0 | | 30.0 | 29.0 | 30.0 | 32.0 |
| UL-94 ⅛" thickness | | HB | V-2 | V-0 | V-0 | V-0 | V-2 | | V-2 | V-2 | V-0 | V-0 |
| Xenon Arc Weather-Ometer (Ranked) | | 1 | 5 | 9 | 7 | 8 | | | 3 | 2 | 6 | 4 |
| Injection Molded Initial Color | | White | Off-White | Off-White | Off-White | Cream | Cream | Decomposition | White | White | Off-White | Cream |
| Visual Migration χ Initial | | | None | None | None | None | None | | None | None | None | None |
| χ 7 days | | | None | None | None | None | None | | None | None | None | None |
| TGA 5% wt. loss °C | | 369 | 281 | 346 | 266 | 292 | 305 | | 311 | 330 | 353 | 351 |
| Isotherm 24 hr. 200° C | | 0.576 0.489 | 1.97 | 0.115 | 3.66 | 4.67 | 2.89 | | 1.99 | 0.606 | 0 | 0.446 |
| Melt Flow g/10 min. Conditions "H", 230° C, 1,200g | | 15.0 | 11.5 | 12.8 | 10.8 | 22.0 | 16.5 | | 6.5 | 25.8 | 36.7 | 11.3 |
| Notched Izod Impact ft. lbs/in. ½ × ½ | | 1.51 | 1.04 | 1.00 | 1.07 | 0.96 | 1.12 | | 1.19 | 1.33 | 1.26 | 0.90 |
| Heat Deflection Temp. °F at 264 psi Annealed at 100° F | | 123 | 122 | 127 | 127 | 121 | 123 | | 117 | 122 | 125 | 139 |
| Concentrate Compounding Temperature, °F | | | 450 | 450 | 450 | 450 | 450 | | 450 | 450 | 450 | 450 |
| Injection Molding Temperature, °F | | 470 | 460 | 460 | 460 | 470 | 470 | | 460 | 470 | 470 | 460 |
| Gardner Color Value, Δ E After 24 hours, Xenon Arc | | 1.9 | 7.8 | 22.6 | 7.3 | 8.5 | 1.9 | | 3.4 | 3.1 | 8.0 | 4.2 |

Table IX

| Resin Additive | Polyester 16/0 | Control (Base Resin) | Prior Art Compounds | | | | | | Other Bis-phenoxy Compounds | | Present Invention Compound |
|---|---|---|---|---|---|---|---|---|---|---|---|
| | | | A | B | C | D | E | F | III | IV | II |
| Oxygen Index, % at 73° F | | 22.0 | 28.0 | 23.0 | 28.5 | | | | 27.5 | 27.5 | 27.5 |
| UL-94 ⅛" thickness | | HB | V-2 | V-2 | V-2 | | | | V-2 | V-2 | V-2 |
| Xenon Arc Weather-Ometer (Ranked) Injection Molded Initial Color | | White | Off-White | Light Tan | Light Grey | | | | Off-White | White | White |
| Visual Migration χ Initial | | | | | | | | | | | |
| χ 7 days | | | | | | | | | | | |
| TGA 5% wt. loss °C | | | | | | | | | | | |
| Isotherm 24 hr., 200° C | | | | | | | | | | | |
| Melt Flow g/10 min. Conditions "H", 230° C, 1,200g | | | | | | | | | | | |
| Notched Izod Impact ft. lbs/in. ½ × ½ | | 1.51 | 0.93 | 1.32 | 1.13 | | | | 1.19 | 1.33 | 1.13 |
| Heat Deflection Temp. °F at 264 psi, Annealed at 100° F | | | | | | | | | | | |
| Concentrate Compounding Temperature, °F | | | 450 | 450 | 450 | | | | 470 | 470 | 450 |
| Injection Molding Temperature, °F | | 470 | 460 | 460 | 460 | | | | 460 | 460 | 460 |
| Gardner Color Value, Δ E After 24 hours, Xenon Arc | | | | | | | | | | | |

Table X

| Resin | PPO | Control (Base Resin) | Prior Art Compounds | | | | | | Other Bis-phenoxy Compounds | | Present Invention Compound |
|---|---|---|---|---|---|---|---|---|---|---|---|
| Additive | 9/3 | | A | B | C | D | E | F | III | IV | II |
| Oxygen Index, % at 73° F | | 26.5 | 25.0 | 30.0 | 28.0 | 31.0 | 27.0 | 30.0 | 27.5 | 29.0 | 27.0 |
| UL-94 ⅛" thickness | | V-1 | V-1 | V-0 | V-0 | V-0 | V-0 | V-0 | V-0 | V-0 | V-0 |
| Xenon Arc Weather-Ometer (Ranked) | | | | | | | | | | | |
| Injection Molded Initial Color | | Brown | Brown | Brown | Brown | Brown | Brown | Brown | Brown | Brown | Brown |
| Visual Migration χ Initial | | | None | None | None | None | Perhaps Slight | None | None | None | None |
| χ 7 days | | | None | None | None | None | None | None | None | None | None |
| TGA 5% wt. loss ° C | | 281 | 249 | 294 | 244 | 243 | 262 | 261 | 277 | 276 | 279 |
| Isotherm 24 hr. 200° C | | 1.87 | 4.07 | 2.21 | 5.00 | 3.88 | 3.19 | 5.40 | 3.08 | 3.19 | 2.35 |
| Melt Flow g/10 min. Conditions (not recorded) | | 1.4 | 3.3 | 2.1 | 2.6 | | 3.7 | | 3.8 | 3.0 | 1.9 |
| Notched Izod Impact ft. lbs/in. ⅛ × ⅛ | | 4.02 | 2.39 | 2.44 | 2.44 | 1.94 | 2.97 | 1.77 | 2.50 | 2.60 | 1.89 |
| Heat Deflection Temp. ° F at 264 psi, Annealed at 235° F | | 209 | 196 | 205 | 200 | 200 | 177 | 194 | 193 | 190 | 203 |
| Concentrate Compounding Temperature, ° F | | | 450 | 450 | 450 | 450 | 450 | 450 | 450 | 450 | 450 |
| Injection Molding Temperature, ° F | | 450 | 450 | 450 | 450 | 450 | 450 | 450 | 450 | 450 | 450 |
| Gardner Color Value, Δ E After hours, Xenon Arc | | | | | | | | | | | |

Table XI

| Resin | PPO | Control (Base Resin) | Prior Art Compounds | | | | | | Other Bis-phenoxy Compounds | | | Present Invention Compound |
|---|---|---|---|---|---|---|---|---|---|---|---|---|
| Additive | 9/3 (Pigmented) | | A | B | C | D | E | F | III | IV | VII | II |
| Oxygen Index, % at 73° F | | 25.0 | | 32.0 | 31.0 | 33.5 | 26.5 | 32.5 | 28.0 | 28.5 | 27.5 | 30.0 |
| UL-94 ⅛" thickness | | HB | | V-0 | V-0 | V-0 | V-0 | V-0 | V-0 | V-0 | V-0 | V-0 |
| Xenon Arc Weather-Ometer (Ranked) | | 1 | | 9 | 6 | 8 | 1 | 7 | 3 | 2 | 5 | 4 |
| Injection Molded Initial Color | | Light Tan | | Light Tan | Light Tan | Tan | Light Tan | Dark Tan | Light Tan | Light Tan | Light Tan | Light Tan |
| Visual Migration χ Initial | | None | | None | None | None | None | None | None | None | None | None |
| χ 7 days | | None | | None | None | None | None | None | None | None | None | None |
| TGA 5% wt. Loss ° C | | 389 | | 335 | 284 | 291 | 311 | 275 | 338 | 324 | 330 | 337 |
| Isotherm 24 hr. 200° C | | 0.299 | | 0.420 | 0.893 | 0.865 | 0.587 | 1.02 | 0.556 | 0.272 | 0.363 | 0.476 |
| Melt Flow g/10 min. | | | | | | | | | | | | |
| Notched Izod Impact ft. lbs/in. ⅛ × ⅛ | | 3.24 | | 2.14 | 2.00 | 1.19 | 2.02 | 1.40 | 2.16 | 2.18 | 1.83 | 1.82 |
| Heat Deflection Temp. ° F at 264 psi, Annealed at 200° F | | 246 | | 233 | 226 | 227 | 210 | 221 | 210 | 207 | 2.28 | 237 |
| Concentrate Compounding Temperature, ° F | | 450 | | 450 | 450 | 450 | 450 | 450 | 450 | 450 | 450 | 450 |
| Injection Molding Temperature, ° F | | 460 | | 460 | 460 | 460 | 460 | 460 | 460 | 460 | 460 | 460 |
| Gardner Color Value, Δ E After 48 hours, Xenon Arc | | 3.6 | | 13.3 | 9.2 | 9.0 | 5.9 | 14.8 | 5.3 | 4.9 | 9.3 | 6.9 |

Table XII

| Resin | HIPS | Control (Base Resin) | Prior Art Compounds | | | | | | Other Bis-phenoxy Compounds | | | | Present Invention BPC |
|---|---|---|---|---|---|---|---|---|---|---|---|---|---|
| Additive | 12/4 | | A | B | C | D | E | F | III | IV | IX | VII | II |
| Oxygen Index, % at 73° F | | 18.5 | 20.0 | 26.0 | 23.5 | 27.0 | 23.0 | 25.0 | 21.0 | 23.0 | 26.0 | 24.0 | 25.5 |
| UL-94 ⅛" thickness | | HB | HB | V-0 | V-0 | V-0 | HB | V-2 | HB | HB | HB | V-0 | V-0 |
| Xenon Arc Weather-Ometer (Ranked) | | 1 | 5 | 11 | 10 | 12 | 3 | 9 | 4 | 6 | 7 | | 8 |
| Injection Molded Initial Color | | White | Light Cream | Cream | Grey Cream | Light Cream | White | Tan | Off-White | Off-White | Off-White | White | Off-White |
| Visual Migration χ Initial | | None | None | Perhaps Slight | Perhaps Slight | None | Perhaps Slight | None | None | None | | None | None |
| χ 7 days | | None | None | None | None | None | None | None | None | None | | None | None |
| TGA 5% wt. loss ° C | | 322 | 270 | 325 | 263 | 254 | 279 | 277 | 304 | 305 | | 328 | 325 |
| Isotherm 48 hr., 150° C | | 0.582 | | | | | | | | | | | 0.22 |
| | | 0.410 | 1.44 | 0.301 | 1.04 | 3.12 | 1.17 | 0.885 | 0.940 | 0.758 | | 0.223 | |
| Melt Flow g/10 min. Conditions "G" 200° C, 5,000g | | 6.2 | 11.0 | 8.8 | 10.4 | 13.3 | 11.1 | 15.8 | 10.7 | 13.8 | | 12.2 | 7.1 |
| Notched Izod Impact ft.lbs/in. ⅛ × ⅛ | | 2.12 | 1.61 | 1.71 | 1.66 | 1.65 | 1.64 | 1.25 | 1.76 | 1.63 | 1.72 | 1.66 | 1.69 |
| Heat Deflection Temp. ° F at 264 psi, Annealed at 160° F | | 182 | 171 | 180 | 171 | 165 | 157 | 172 | 172 | 157 | | | 177 |
| Concentrate Compounding | | — | 400 | 400 | 400 | 400 | 400 | 400 | 450 | 400 | | 400 | 450 |

Table XII-continued

| Resin | HIPS | Control (Base Resin) | Prior Art Compounds | | | | | | Other Bis-phenoxy Compounds | | | | Present Invention BPC |
|---|---|---|---|---|---|---|---|---|---|---|---|---|---|
| Additive | 12/4 | | A | B | C | D | E | F | III | IV | IX | VII | II |
| Temperature, °F Injection Molding Temperature, °F | | 450 | 450 | 450 | 450 | 450 | 430 | 430 | 450 | 430 | 450 | 450 | 450 |
| Gardner Color Value, Δ E After 24 hours, Xenon Arc | | 0.7 | 17.6 | 33.6 | 23.9 | 34.3 | 7.0 | 11.0 | 11.0 | 20.9 | 16.3 | 12.7 | 14.4 |

Table XIII

| Resin | HIPS | Control (Base Resin) | Prior Art Compounds | | | | | | Other Bis-phenoxy Compounds | | | Present Invention Compound |
|---|---|---|---|---|---|---|---|---|---|---|---|---|
| Additive | 16/0 | | A | B | C | D | E | F | III | IV | VII | II |
| Oxygen Index, % at 73° F | | 18.5 | 18.5 | 22.0 | 22.0 | | 21.5 | | 21.0 | 21.5 | 22.0 | 22.0 |
| UL-94 ⅛"thickness | | HB | HB | V-2 | HB | | HB | | HB | HB | HB | HB |
| Xenon Arc Weather-Ometer (Ranked) | | 1 | 2 | 9 | 7 | | 5 | | 3 | 6 | 8 | 4 |
| Injection Molded Initial Color | | White | Off-White | Cream | Cream | De-Composition | White | Decom-position | Off-White | White | White | Cream |
| Visual Migration χ Initial | | | None | None | None | sition | None | | None | None | None | None |
| χ 7 days | | | None | None | None | | None | | None | None | None | None |
| TGA 5% wt. loss °C Isotherm 72 hr. 150° C | | | | | | | | | | | | |
| Melt Flow g/10 min. Conditions "G" 200 C 5000g | | | | | | | | | | | | |
| Notched Izod Impact ft.lbs/in. 12 × ⅛ | | 2.12 | 1.64 | 1.69 | 1.58 | | 1.59 | | 1.62 | 1.60 | 1.71 | 1.66 |
| Heat Deflection Temp. °F at 264 psi, Annealed at 160° F | | | | | | | | | | | | |
| Concentrate Compounding Temperature, °F | | | 400 | 400 | 400 | | 400 | | 400 | 400 | 400 | 400 |
| Injection Molding Temperature, °F | | 450 | 450 | 450 | 450 | | 450 | | 450 | 450 | 450 | 450 |
| Gardner Color Value, Δ E After 24 hours, Xenon Arc | | 0.7 | 19.4 | 25.9 | 23.2 | | 21.7 | | 34.0 | 30.5 | 40.0 | 17.8 |

Table XIV

| Resin | HIPS | Control (Base Resin) | Prior Art Compounds | | | | | | Other Bis-phenoxy Compounds | | | Present Invention Compound |
|---|---|---|---|---|---|---|---|---|---|---|---|---|
| Additive | 30/0 | | A | B | C | D | E | F | III | IV | VII | II |
| Oxygen Index, % at 73° F | | 18.5 | 21.0 | 25.5 | 25.5 | 30.0 | 25.0 | 27.0 | 27.0 | 25.0 | 27.0 | 32.0 |
| UL-94 ⅛" thickness | | HB | HB | V-0 | V-0 | V-0 | V-0 | V-0 | V-0 | V-0 | V-0 | V-0 |
| Xenon Arc Weather-Ometer (Ranked) | | 1 | 5 | 10 | 7 | 9 | 2 | 8 | 4 | 6 | 11 | 3 |
| Injection Molded Initial Color | | Trans-luscent | Biege | Light Grey | Grey | Brown | Light Tan | Tan | Off-White | Off-White | | Light Beige |
| Visual Migration χ Initial χ 7 days | | | | | | | | | | | | |
| TGA 5% wt. loss °C Isotherm 72 hr., 150° C | | | | | | | | | | | | |
| Melt Flow g/10 min. Conditions "G" 200° C, 5,000g | | | | | | | | | | | | |
| Notched Izod Impact ft.lbs/in. ⅛ × ⅛ | | 2.12 | 1.10 | 1.21 | 1.43 | 1.45 | 1.27 | 1.11 | 1.39 | 1.35 | 1.46 | R 1.08 1.10 |
| Heat Deflection Temp. °F at 264 psi, Annealed at 160° F | | | | | | | | | | | | |
| Concentrate Compounding Temperature, °F | | | 450 | 450 | 430 | 356 | 392 | 356 | 450 | 400 | 392 | 450 |
| Injection Molding Temperature, °F | | 450 | 430 | 430 | 410 | 380 | 400 | 380 | 430 | 410 | 420 | 430 |
| Gardner Color Value, Δ E After 24 hours, Xenon Arc | | 0.7 | 22.4 | 29.7 | 15.8 | 10.4 | 5.1 | 12.1 | 17.2 | 24.9 | 36.3 | 6.8 |

Referring to Tables I through XIV in general, it is readily apparent that the incorporation of additives in polymer systems is highly unpredictable. Even in the same polymer, "structurally related" prior art compounds, "other bis-phenoxy compounds" and the present invention bis-phenoxy compound produced completely different results. However, out of all the data shown therein it is clear that the combination of the present invention bis-phenoxy compound and enhancing agent result in an unexpected, superior, flame retarded nylon plastic composition which has commercial application.

Specifically, Table I shows the results of testing a nylon polymer containing 12% PAC, OBPC, or BPC and 4% EA. The nylon/BPC/EA combination is the only one of the OBPC or BPC which produced V-0 (UL-94) with good thermal stability (e.g. no visual migration) and, in general color values ΔE, on an overall average basis, substantially closer to the control (without additives). Thus this particular BPC compound is unique; note the V-2 (poor) values of the OBPC and Compounds A and C. With reference to the OBPC, (Formulae IV and VII) the thermal stability was quite poor as noted by the decomposition problems. While (Prior Art compound) B yielded a V-0 (UL-94) composition, the Notched Izod Impact value was low. D, E, and F show nonefficacy thereof as flame retardants because of the molding problems and again point out the non-predictability of additives incorporated in either the same or various polymers.

EXAMPLE II

Regarding Formulation Nos. 1 - 10 in Table XV, a virgin polyacrylonitrile plastic material, (T-61 polymer crumb, a product of American Cyanamid and characterized as a copolymer of 93% by weight acrylonitrile and about 7% by weight methyl methacrylate) is utilized as the base resin in order to prepare 10 formulations (plastic compositions). With the exception of formulation No. 1, the particular "other bis-phenoxy compound" (and the antimony trioxide enhancing agent where indicated) is incorporated into the plastic (which is dried to remove moisture therefrom) by adding both to a Waring blender which contains acetone as a dispersing liquid. The resultant mixture, after blending for 3 minutes, is poured into evaporation dishes and the acetone evaporated, first at room temperature (20°-25° C) for 60 minutes and followed by oven drying at 60° C for one hour.

The percentages by weight of each component utilized in the respective formulations are listed in Table XV. Each formulation is discharged from the evaporation dish and is ground into powder. The powder is subjected to compression molding in a Wabash press by placing said powder between two platens, the bottom of which contains four equal size depressions three inches by five inches by ⅛ inch deep. The top platen is then placed over the bottom platen and heat transfer means supplied thereto in order to melt said powder and thus provide solid samples (after cooling) for testing. The temperature and ram pressure utilized are respectively 100° C and 30 tons.

A polypropylene plastic material, (Hercules Profax ® 6523 grade of polypropylene) is utilized as the base resin in order to prepare 13 formulations (plastic compositions) — Nos. 11-23 shown in Table XV. With the exception of formulation No. 11, the particular "other bis-phenoxy compound" (and the antimony trioxide enhancing agent where indicated) is incorporated into the plastic and solid samples prepared according to the procedure set forth in Example I.

A virgin nylon 6 plastic material, (Zytel ® 211, a product of E. I. du Pont de Nemours and Co., Wilmington, Delaware) is utilized as the base resin in order to prepare 7 formulations (plastic compositions) — Nos. 24-30 shown in Table XV. With the exception of formulation No. 24, the particular "other bis-phenoxy compound" (and the antimony trioxide enhancing agent where indicated) is incorporated into the plastic and solid samples prepared according to the procedure set forth in Example I.

Regarding Formulation Nos. 31-33 in Table XV, a virgin polymethylmethacrylate plastic material, Plexiglas ® V (811) a commercially available product of Rohm and Haas Company, Philadelphia, Pennsylvania and being substantially free of additives, is utilized as the base resin in order to prepare 3 formulations (plastic compositions). With the exception of formulation No. 31, the particular "other bis-phenoxy compound" (and the antimony trioxide enhancing agent where indicated) is incorporated into the plastic and solid samples prepared according to the procedure set forth in Example I.

Referring to Formuation Nos. 34-37 in Table XV, an acrylonitrile-butadiene-styrene (ABS) polymer plastic material, Marbon TP-2098, a product of Marbon Division, Borg-Warner Corporation, Washington, West Virginia, and which is a slight process variation of their commercially available "T" grade ABS polymer, is utilized as the base resin in order to prepare four (4) formulations (plastic compositions). These formulations, Nos. 34-37, are prepared in accordance with the procedure described in ASTM D-1897-68.

Portions of the samples of each respective formulation (Nos. 1-37, Table XV) prepared respectively according to the above described procedures are then subjected to two different standard flammability tests, i.e. UL 94 and ASTM D-2863-70, i.e. Oxygen Index, O.I.

The results of these flammability tests are shown in Table XV.

TABLE XV
FLAMMABILITY DATA FOR DIFFERENT PLASTIC COMPOSITIONS CONTAINING "OTHER BIS-PHENOXY COMPOUNDS" WITH AND WITHOUT ENHANCING AGENTS

| Formulaton No. | "Other Bis-phenoxy Compounds" Formula | % | Enhancing Agent $Sb_2O_3$, % | Oxygen Index % | UL 94 Value |
|---|---|---|---|---|---|
| Polyacrylonitrile Polymer | | | | | |
| 1. | — | 0 | 0 | 22.5 | SB |
| 2. | IV | 2 | 0 | 23.5 | SB |
| 3. | IV | 5 | 0 | 23.8 | SB |
| 4. | IV | 10 | 0 | 24.0 | SB |
| 5. | IV | 5 | 5 | 25.3 | SB |
| 6. | IV | 5 | 10 | 25.3 | SB |
| 7. | III | 2 | 0 | 23.0 | SB |
| 8. | III | 5 | 0 | 23.0 | SB |
| 9. | III | 10 | 0 | 24.0 | SB |
| 10. | III | 5 | 5 | 25.0 | SB |
| Polypropylene Polymer | | | | | |
| 11. | — | 0 | 0 | 18.0 | Burns |
| 12. | IV | 15 | 0 | 20.0 | SB |
| 13. | IV | 15 | 5 | 22.8 | SB |
| 14. | IV | 20 | 5 | 26.0 | SB |
| 15. | IV | 25 | 0 | 24.0 | SB |
| 16. | IV | 25 | 5 | 26.0 | SB |
| 17. | III | 15 | 0 | 19.0 | SB |
| 18. | III | 15 | 5 | 22.0 | SB |
| 19. | III | 20 | 5 | 25.0 | SB |
| 20. | III | 25 | 0 | 23.0 | SB |
| 21. | III | 25 | 5 | 25.0 | SB |
| 22. | IV | 20 | 10 | 25.0 | SB |
| 23. | III | 20 | 10 | 24.0 | SB |
| Nylon | | | | | |
| 24. | — | 0 | 0 | 23.0 | SB |
| 25. | IV | 10 | 0 | 23.5 | SB |
| 26. | IV | 10 | 3 | 24.5 | SB |
| 27. | IV | 13 | 3 | 27.5 | SE-2 |
| 28. | III | 10 | 0 | 23.5 | SB |
| 29. | III | 10 | 3 | 24.0 | SB |
| 30. | III | 13 | 3 | 27.0 | SE-2 |
| Polymethylmethacrylate Polymer | | | | | |
| 31. | — | 0 | 0 | 18.0 | SB |
| 32. | III | 15 | 0 | 20.5 | SB |
| 33. | III | 15 | 5 | 20.5 | SB |
| Acrylonitrile-Butadiene-Styrene (ABS) Polymer | | | | | |
| 34. | — | 0 | 0 | 19.0 | HB(SB) |
| 35. | III | 15 | 0 | 27.0 | HB(SB) |
| 36. | III | 15 | 5 | 32.5 | V-O(SE-O) |
| 37. | IV | 15 | 5 | 35.0 | V-O(SE-O) |

Referring to Table XV, the "other bis-phenoxy compound" formula III or IV relates to the structural formulae heretofor set forth; and the UL-94 values are on a graduated scale wherein the highest degree to lowest degree of flame retardancy is respectively SE-0 (V-0), SE-1 (V-1), SE-2 (V-2), SB (HB) and Burns.

The results shown in Table XV demonstrate the unexpected and completely unpredictable results of the plastic composition (Formulations Nos. 36 and 37) containing a three component system which consists of the "other bis-phenoxy compounds," an enhancing agent and acrylonitrile-butadiene-styrene (ABS) polymer as compared to the use of such "other bis-phenoxy compound" with or without an enhancing agent in a polyacrylonitrile polymer, a polymethlmethacrylate polymer, a nylon polymer, and a polypropylene polymer, the latter four of which polymers show substantially no increase in flame retardancy via the use of said "other bis-phenoxy compounds," with or without an enhancing agent.

Specifically referring to the polyacrylonitrile polymer compositions Nos. 1 - 10, formulation No. 1 (the control) has an UL value of SB. In Nos. 2 - 10, the use of the particular "other bis-phenoxy compound" (with or without the enhancing agent) results, within experimental accuracy, in no increase in flame retardancy via incorporation of 2%, 5%, or 10% of the "other bis-phenoxy compound" per se.

Regarding the use of an enhancing agent in formulation Nos. 5 and 6, the results obtained therefrom show that there is no increase in flame retardancy. Thus, for example, No. 1 (control) has an UL value of SB and Nos. 5 and 6 (which have different enhancing agent levels, 5% versus 10%) have also an UL value of SB. In viewing the results of No. 3 (5% - 0%) and No. 5 (5% - 5%), it can be seen that even the use of the enhancing agent does not increase flame retardancy in a polyacrylonitrile polymer.

With reference to the polypropylene polymer compositions Nos. 11 thru 23, it can readily be seen from the UL 94 values that the incorporation of the particular "other bis-phenoxy compound" therein resulted in substantially little, if any, increase in flame retardancy as compared to the control, considering the experimental accuracy. Even the use of an enhancing agent did not result in an increase in flame retardancy, note No. 12-SB and No. 13-SB. Predicated upon this data, it is thus seen that the incorporation of the "other bis-phenoxy compounds" (with or without an enhancing agent) in a polypropylene results in no flame retardant efficacy.

Specifically referring to the nylon polymer compositions Nos. 24 - 30, formulation No. 24 (the control) had an UL value of SB. In Nos. 25 - 28, the use of the particular "other bis-phenoxy compound" results in no increase in flame retardancy via incorporation of 10% (SB versus SB) of the "other bis-phenoxy compound" per se.

Regarding the use of an enhancing agent in formulation Nos. 26, 27, 29, and 30, the results obtained therefrom show there is substantially little, if any, increase in flame retardancy. Thus, for example, No. 1 (control) has an UL value of SB and Nos. 26 and 29 also have an UL value of SB. While Nos. 27 and 30 each have an UL value of SE-2, this is not considered a significant increase and thus even the use of the enhancing agent does not result in flame retardancy efficacy.

With reference to the polymethylmethacrylate polymer compositions Nos. 31, 32 and 33, it can readily be seen from the UL values, i.e. all SB, that the incorporation of the particular "other bis-phenoxy compound" therein results in no increase in flame retardancy as compared to the control. Even the use of an enhancing agent did not result in an increase in flame retardancy. Consequently, it can readily be seen that the incorporation of the "other bis-phenoxy compounds" in a polymethylmethacrylate results in no flame retardant efficacy.

The most unexpected results in flame retardancy were obtained via the incorporation of the particular "other bis-phenoxy compounds" and enhancing agents in an acrylonitrile-butadiene-styrene (ABS) polymer. Referring specifically to formulation Nos. 34 through 37, the control (formulation No. 34) had an UL value of HB(SB). Notwithstanding the incorporation of 15% (No. 35) of the particular "other bis-phenoxy compound" per se in the ABS polymer, there still results a UL value of SB. Use of the enhancing agent with both "other bis-phenoxy compounds" formulae III and IV, in formulation Nos. 36 and 37 results in an unexpected UL value change from SB (No. 35) to SE-0/V-0 (No. 36) and SE-0/V-0 (No. 37). In view of these results, it was quite unexpected that the ABS polymer system, having incorporated therein the particular "other bis-phenoxy compounds" and enhancing agent would show such superior flame retardant efficacy based on the results obtained from the performance of the other four (4) polymers, i.e. polyacrylonitrile, polypropylene, nylon and polymethylmethacrylate polymer systems having the same "other bis-phenoxy compounds" and enhancing agents incorporated therein. By the same token and with particular reference to the results disclosed in Example I, the "other bis-phenoxy compound"—OBPC (formulae III) did not exhibit any substantial flame retardancy efficacy (V-2) in nylon at the "12/4" level (Table I) whereas the present invention bis-phenoxy compound exhibited superior and unexpected efficacy (V-0) and good thermal stability at the same level of usage.

Consequently, it can readily be seen that it is not possible to predict the efficacy and/or functionality of any halogen-containing material (which may be suggested as a flame retardant) in any polymeric system until one actually conducts a substantial research program thereon and ascertains certain properties of the "flame retarded" system and its utility.

EXAMPLE III

The procedure of Examples I and II are repeated except that the enhancing agent used is zinc borate instead of antimony oxide. Substantially the same results are obtained using zinc borate as those using antimony oxide.

EXAMPLE IV

The (present invention) bis-phenoxy compound described herein is subjected to toxicity tests and it is found that this compound is not toxic orally, not irritating to the eye and not irritating to the skin, all as measured by the guidelines of the Federal Hazardous Substances Act. Furthermore, rat feeding studies indicate this material is not biologically persistent, an important property to minimize ecological imbalance.

In summary, the results shown on Tables I through XIV and reviewed with the aforementioned criteria, i.e. UL-94 rating V-0 and physical properties (such as thermal stability), and are presented in Table XV in terms of whether there is commercial utility, (taking into consideration most importantly V-0 rating and then physical/mechanical properties) i.e. similar to those results shown for octabromobiphenyl in *Modern Plastics Ency-*

*clopedia*, ibid. Table XVI sets forth more vividly the difference between the present bis-phenoxy compounds, other bis-phenoxy compounds and the prior art and also the different results obtained when different polymers have the same additives incorporated therein; and also confirming those specific observations regarding the difference in polymer systems as noted by the Norris et al paper, ibid.

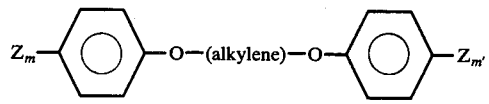

wherein (a) Z is bromine; (b) $m$ and $m'$ are independent and are integers having a value of 5 and (c) alkylene is FLAME RETARDANT EFFICACY OF DIFFERENT ADDITIVES IN DIFFERENT POLYMER SYSTEMS
(IS THERE COMMERCIAL UTILITY BASED ON A NYLON SYSTEM CRITERIA)

| Polymers | Prior Art Compounds + Enhancing Agents | | | | | | OBPC + EA | | | | | Present Invention BPC + EA |
|---|---|---|---|---|---|---|---|---|---|---|---|---|
| I. Present Invention | A | B | C | D | E | F | III | IV | IX | VIII | VII | II |
| Nylon | No | Yes | No | | No | | No | No | | | No | Yes |
| II. Comparative Polymers | | | | | | | | | | | | |
| ABS | No | ?* | ?* | ?* | No | Yes | Yes | Yes | Yes | Yes | Yes | Yes |
| Polycarbonate | No | No | No | No | Yes | No | Yes | Yes | | | Yes | Yes |
| Polyethylene (LDPE) | | ?* | No | No | No | No | No | Yes | No | | No | Yes |
| Polypropylene | No | No | No | No | No | Yes | No | No | | | No | No |
| Polyester | No | ?* | ?* | ?* | No | No | No | No | | | Yes | Yes |
| Polyphenylene oxide (PPO) | | ?* | ?* | ?* | Yes | ?* | Yes | Yes | | | Yes | Yes |
| Polystyrene (HIPS) | No | No | No | No | No | No | No | No | No | | No | Yes |
| Polyacrylonitrile | | | | | | | No | No | | | | |
| Polymethylmethacrylate | | | | | | | No | No | | | | |

*Perhaps; veery high ΔE values

In view of the foregoing Examples and remarks, it is seen that the plastic compositions, which incorporate a three component system (including the bis-phenoxy compounds), possess characteristics which have been unobtainable in the prior art. Thus, the use of these particular bis-phenoxy compounds and an enhancing agent in nylon as flame retardants therefor is quite unique since it is not possible to predict the effectiveness and functionality of any particular material in any polymer system until it has actively undergone incorporation therein and the resultant plastic composition evaluated according to certain criteria such as UL-94 and various ASTM Standards. Furthermore, it is necessary, in order to have commercial utility, that the resultant flame retarded plastic composition possess characteristics such as being non-toxic and not biologically persistent. Use of the bis-phenoxy compounds and an enhancing agent in nylon has accomplished all of these objectives.

Thus, in order to meet the needs and standards of commerce, it is necessary that a successful candidate fulfill all of the requirements outlined above, not just a selected group. It was totally unexpected that this specific bis-phenoxy compound meets these requirements in all aspects contrary to the expectations of the suggested teachings of the prior art.

The above examples have been described in the foregoing specification for the purpose of illustration and not limitation. Many other modifications and ramifications will naturally suggest themselves to those skilled in the art based on this disclosure. These are intended to be comprehended as within the scope of this invention.

What is claimed is:

1. A plastic composition comprising a three component system consisting of (1) nylon polymer, (2) a bis-phenoxy compound, which functions as a flame retardant for said composition, having the formula —(CH$_2$)$_2$— and (3) a flame retardant enhancing agent.

2. The composition as set forth in claim 1 wherein the amount of said bis-phenoxy compound employed is from about 5% to about 25% by weight, based on the total weight of said composition.

3. The composition as set forth in claim 2 wherein the enhancing agent is selected from the group consisting of oxides and halides of Groups IV A and V A of the Periodic Table of Elements.

4. The composition as set forth in claim 3 wherein the enhancing agent is antimony oxide.

5. A flame retarded, shaped plastic composition comprising a three component system which consists of (a) a nylon polymer, (b) a bis-phenoxy compound which is 1,2-bis(2,3,4,5,6-pentabromophenoxy)ethane and (c) an enhancing agent selected from the group consisting of oxides of antimony, arsenic and bismuth; with the proviso that said plastic composition is further characterized by having a flammability rating of SE-0 (V-0) as determined by the UL-94 procedure described in the specification.

6. A substantially white, flame retarded, injection molded plastic composition comprising a three component system which consists of (a) a nylon polymer, (b) a bis-phenoxy compound which is 1,2-bis(2,3,4,5,6-pentabromophenoxy)ethane and (c) an enhancing agent selected from the group consisting of oxides of antimony, arsenic and bismuth; with the proviso that said plastic composition is further characterized by having a flammability rate of SE-0 (V-0) as determined by the UL-94 procedure described in the specification.

7. The composition as set forth in claim 6 wherein (a) the bis-phenoxy compound is present in an amount of from about 1% by weight to about 25% by weight, based on the total weight of said composition and (b) the enhancing agent is antimony trioxide and is present in an amount of from about 1% by weight to about 10% by weight, based on the total weight of said composition.

8. The composition as set forth in claim 7 wherein the amount of said bis-phenoxy compound is about 12% by weight, based on the total weight of said composition, and said enhancing agent is present in an amount of about 4% by weight, based on the total weight of said composition.

9. The composition as set forth in claim 7 wherein said composition is characterized by having no migration over a period of approximately seven days and a Δ E Color Value of about 7.9 as determined by test procedure set forth in the specification.

10. The composition as set forth in claim 7 which said nylon polymer is a nylon 6 polymer.

11. The composition as set forth in claim 7 wherein said nylon polymer is a 66 nylon polymer.

12. The composition as set forth in claim 7 wherein said nylon polymer is a 610 nylon polymer.

13. The composition as set forth in claim 7 wherein said nylon polymer is a 66/610/6 nylon copolymer.

14. The composition as set forth in claim 7 wherein said nylon polymer is a 66/610 nylon copolymer.

15. The composition as set forth in claim 7 wherein said nylon polymer is a 66/612 nylon copolymer.

* * * * *